Aug. 17, 1965    J. V. WILLIFORD ETAL    3,201,673
INDUCTION MOTOR STARTING CIRCUITS
Filed Aug. 28, 1961
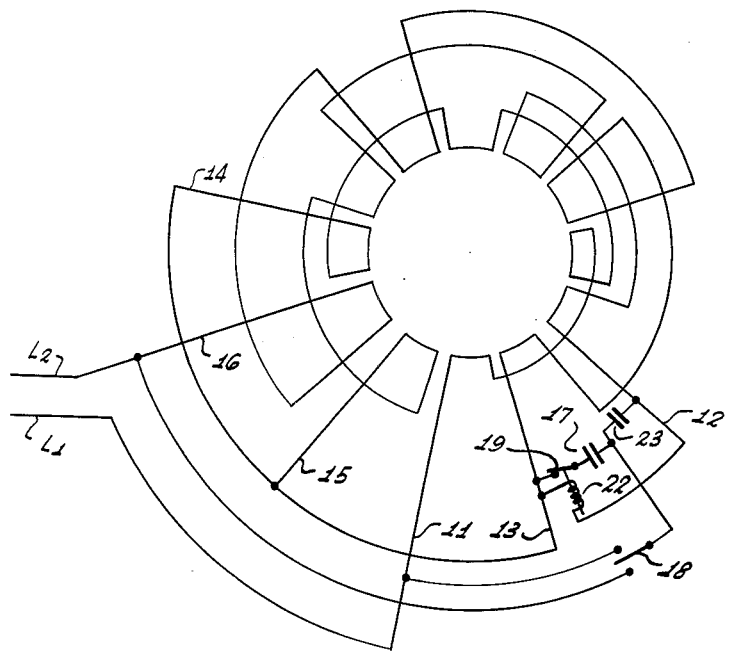
Fig. 1
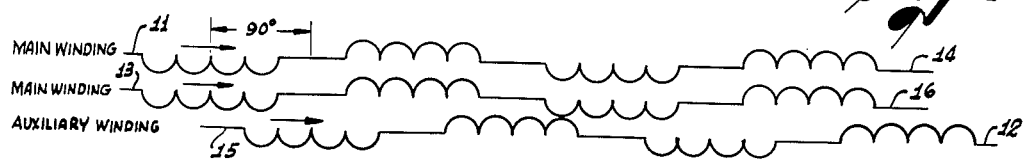
Fig. 2
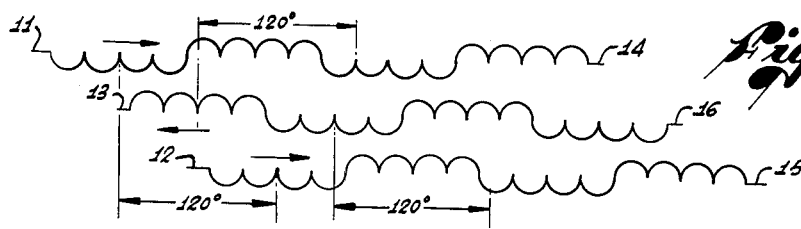
Fig. 3
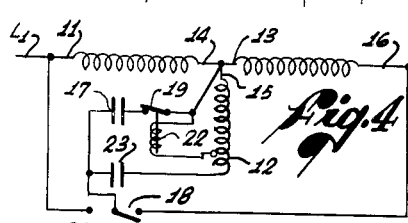
Fig. 4
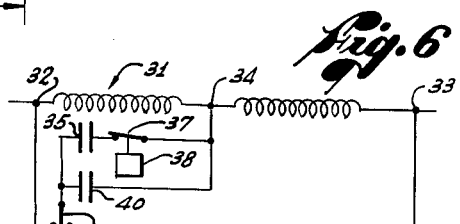
Fig. 6
Fig. 5
INVENTORS
JACOB V. WILLIFORD
HORACE B. FORD
BY Fulwider Mallingly & Huntley
ATTORNEYS ID 3,201,673
INDUCTION MOTOR STARTING CIRCUITS
Jacob V. Williford, 136 H St. NE., Ephrata, Wash., and Horace B. Ford, Abilene, Tex.; said Ford assignor to said Williford
Filed Aug. 28, 1961, Ser. No. 134,530
13 Claims. (Cl. 318—221)

This invention relates generally to electric motors, and more particularly to alternating current induction motors.

In the operation of alternating current, single-phase, induction motors, one of the problems is to provide sufficient starting torque to bring the motor up to speed under the load placed upon it under starting conditions. This is commonly done by providing means for producing an out-of-phase field, approaching two-phase action, to provide starting torque. This has usually required auxiliary equipment within the motor frame, which in most cases must be removed from the circuit when running, or which remains at a detriment to the motor performance. One manner of producing an out-of-phase field condition which has been utilized in the past is by means of a capacitor in series with an auxiliary winding, separate and distinct from the main winding of the single-phase motor, and generally placed in quadrature to the main winding, the auxiliary winding and its series capacitor being electrically in parallel with the main winding.

According to the present invention, starting torque is provided in a single-phase motor by utilizing the same winding for both starting and running conditions. Specifically, the starting torque is provided by placing a capacitor in shunt or parallel with a portion, preferably half, of the main running winding of the motor to provide an out-of-phase relation to the currents flowing through the different portions of the main motor winding. After the motor comes up to speed, for example, at 80 percent of its rated r.p.m., the capacitor circuit is opened by a centrifugal switch or a relay responsive to counter E.M.F., or a similar device, and thereafter the motor operates as a straight single-phase induction motor, employing all of the winding in running as used in the starting operation. Which half of the motor winding is shunted by the starting capacitor will determine the leading-lagging characteristics of the currents through the winding and the direction of rotation of the rotor of the motor.

A straight single-phase motor according to the present invention is preferably wound with separate coils equal in number to the number of slots in the stator, and wound distributed about the stator, not in space phase on top of each other. For example, this would give nine coils per pole in a 4-pole, 36-slot motor. Also, the coils preferably do not span full pitch from pole to pole, but in the above example would span eight slots, or two slots under full pitch, similar to three-phase windings, thus overlapping the coils about the stator. The motor thus described will have a full coverage single winding distributed and chorded about the stator.

A further development according to the present invention is to provide an electric motor having a three-phase stator winding, which may be in the form of three distinct groups distributed about the stator in overlapping chorded relation similar to the single main winding described above. Two adjacent coil groups are here connected in series to form a main winding for single-phase operation, and the starting capacitor is connected in parallel across either of these coil groups to effect rotation of the rotor in the desired direction. In this operation the third coil group can be left out of the circuit entirely, it can be used as a sensing coil for counter E.M.F. to open the shunt capacitor circuit, or it may be utilized in either starting or running conditions, or both, with a serially connected capacitor to provide added torque when so connected. This form of motor has the added advantage that when three-phase power is available the coil groups may be connected in either Y or delta and the motor operated as a standard three-phase motor. A similar arrangement can, of course, be accomplished for two-phase motor windings and operation as a conventional two-phase motor when such power is available.

It is, therefore, an object of the present invention to provide an improved alternating current induction motor.

Another object of this invention is to provide a new and improved method of starting an alternating current induction motor from a single phase supply.

Another object of this invention is the provision of an electric motor constructed for optional operation from either single-phase or polyphase power with comparable horsepower output and starting torque.

A further object of this invention is to provide an induction motor having a distributed winding in which starting torque is provided by shunting a portion of the winding of the motor by a capacitor.

A still further object of this invention is the method and circuit for operating an induction motor having main and auxiliary windings in which starting torque is predominantly supplied by shunting a portion of the main winding of the motor with a capacitor and in which the auxiliary winding is fed through a series capacitor to provide auxiliary starting and/or running torque.

Other objects and features of this invention will be readily apparent to those skilled in the art from the following specification and the appended drawing, in which:

FIGURE 1 is a schematic representation of a distributed three-phase motor winding connected for one form of single-phase operation;

FIGURE 2 is a schematic representation of the relationship of the main and auxiliary windings of FIGURE 1 in single-phase operation;

FIGURE 3 is a schematic representation of the relative electrical relation of the windings of FIGURE 1 on three-phase operation;

FIGURE 4 is a wiring diagram for the motor corresponding to FIGURE 1;

FIGURE 5 is a wiring diagram for an induction motor employing a distributed main winding only and providing for shunt capacitor starting thereof; and FIGURE 6 is a wiring diagram similar to FIGURE 5 but with an additional shunt running capacitor.

In the electric motor of FIGURE 1 of the drawings, there is provided a stator winding wound in three distinct coil groups, specifically shown as having four poles providing for 1800 r.p.m. operation. Any desired number of slots can be selected for the motor stator; for example, thirty-six or forty-eight, and in the case of thirty-six slots there will be nine slots per pole. Chording of the distributed coils may be provided for by having a span for the coils less than full pitch from pole to pole; for example, from one to eight, or two slots under full pitch. The coils will therefore be overlapped. Since the motor is to be operated optionally as a single-phase motor, the wire of the winding is preferably selected to provide a circular mil size and current-carrying capacity substantially double that provided for three-phase operation at rated horsepower, thus providing for single-phase operation at rated horsepower without excessive heating. The winding and magnetic circuit are preferably designed to provide relative saturation of the stator on both single-phase and polyphase operation. The resulting coil groups are labeled by their termini as 11–14, 13–16 and 12–15.

For ordinary three-phase operation, it will be understood that the coil groups may be connected together in conventional manner; for example, a series Y connection would be provided by connecting terminal points 14, 15, 13 together and feeding three-phase power to the terminal points 11, 12, and 16.

For optional single-phase operation of the three-phase wound motor, two adjacent coil groups are connected in series to form the main winding of the motor across which the single-phase lines are connected. As specifically illustrated in FIGURES 1 and 4, the coil groups 11–14 and 13–16 are connected in series by connecting the terminal points 13 and 14 together, and the resulting main winding is fed at the terminal points 11 and 16 from power lines $L_1$ and $L_2$. According to one manner of operating the motor, the winding 12–15 is not energized and may remain idle or may provide only a sensing circuit for counter E.M.F.

To secure starting torque in the motor so far described, there is provided a shunting capacitor 17 which is connected in parallel with one of the coil groups forming the main winding to give an out-of-phase relationship to the currents through the two coil groups. One side of the capacitor 17 is specifically shown as connected to the common terminal point 13, 14 of the serially connected, main winding coil groups, and the other side of the capacitor 17 is optionally connected to either line $L_1$ or $L_2$ by a reversing switch 18. The simple swinging of the capacitor connection from one line to the other will determine the leading-lagging characteristics of the currents in the two coil groups, and thus the direction of rotation of the rotor of the motor. In series with the capacitor 17 are the normally closed contacts 19 of a voltage-sensitive relay whose operating coil 22 may be made responsive to the counter E.M.F. of the motor by connecting it across a sensing coil, specifically illustrated as being the motor winding 12–15, or a portion thereof.

While the above description applies to one manner of single-phase operation of a three-phase wound induction motor according to the present invention, FIGURES 1, 2 and 4 specifically illustrate a circuit and method of operation in which the third phase winding 12–15 is connected to supply additional starting and running torques. As specifically illustrated, a second bank of capacitors 23, forming running capacitors, is connected in series with the winding 12–15 and the midpoint of the main motor winding formed by the serially connected windings 11–14 and 13–16. Thus, the terminal points 13, 14 and 15 of the three coil groups are connected together. The terminal points 11 and 16 are connected directly to the lines $L_1$ and $L_2$, and the terminal point 12 is connected through the running capacitor 23 and reversing switch 18 to either $L_1$ or $L_2$, as determined by the position of the switch.

In the single-phase operation of the polyphase wound induction motor according to the present invention, the position of the reversing switch 18 will determine the direction of rotation of the rotor of the motor, and when lines $L_1$ and $L_2$ are energized, starting currents will flow through the coil groups 11–14 and 13–16, providing the main winding, in out-of-phase relationship as a result of the shunting capacitor 17. When the rotor of the motor comes up to approximate speed, for example, 80 percent of the rated r.p.m., the voltage-sensitive relay operates to open contacts 19, whereby the capacitor 17 is disconnected from the circuit and the motor operates as a straight induction motor employing the same winding as in starting.

The above description applies whether or not the winding 12–15 is energized. As specifically illustrated, the winding 12–15, which is displaced 90 degrees from the main winding 11–14, 13–16, will be energized in quadrature through the serially connected capacitor 23, and will thus provide additional torque under both starting and running conditions. The winding 12–15 will contribute, however, only a minor portion of the total torque; for example, less than 10 percent, and its main function on single-phase operation may be as a sensing coil for the voltage-sensitive relay 21. The winding 12–15 may be energized only under running conditions, where desired.

The wiring diagram of FIGURE 5 represents a single-phase, alternating current induction motor, employing a single, distributed, chorded winding 31, having terminals 32, 33 and a midpoint 34. A starting capacitor 35 is provided for shunting either half of the winding 31 through the reversing switch 36. Serially connected with the starting capacitor 35 is a normally closed switch 37 controlled by an operator 38 which may be speed-responsive in conventional manner, from counter E.M.F., centrifugal force, etc. FIGURE 5 illustrates the starting of a straight single-phase motor having a full coverage single winding distributed in chorded relation about the motor stator, in which a capacitor is placed in shunt with a portion of the motor winding, specifically half thereof. The two portions or halves of the motor winding are thus energized by currents which are out of phase, thereby, producing a starting torque. The switch 37 is opened when the motor is at a predetermined speed, so that the motor operates thereafter as a straight single-phase induction motor employing the entire winding thereof.

FIGURE 6 shows a wiring diagram similar to FIGURE 5 but also employing a running capacitor 40 in parallel with the starting capacitor 35. This running capacitor is preferably of the oil filled type and remains in the circuit after switch 37 opens to provide a double duty running winding, the leading half of the winding always pulsing ahead of the whole winding.

It will be seen that both the polyphase wound motor of FIGURES 1, 2 and 4, and the single-phase wound motor of FIGURE 5 have in common the provision of a main motor winding which is distributed about all or a portion of the stator of the motor and which provides for the connection of a starting capacitor in shunt relation to a portion, preferably half, of the main winding to secure maximum starting torque for the motor. Additionally, the motor of FIGURES 1, 2 and 4 may be operated as a conventional three-phase motor, as in FIGURE 3 and as previously described.

The starting capacitors 17 and 35 may be electrolytic and the running capacitor 23 oil filled, or both may be of either type, as desired.

While the polyphase construction has been specifically illustrated as three phase, the construction of the motor lends itself equally well to two phase-single phase design and operation.

In both forms of the motors herein described, the present invention provides for higher single-phase starting torques than in conventional motors, and for increased single-phase horsepower output for a given size motor, comparable to polyphase operation. Also, the motors operate on single phase with greatly lessened noise and vibration.

While certain preferred embodiments of the invention have been specifically shown and described, it will be understood the invention is not limited thereto as many variations will be apparent to those skilled in the art, and the invention is to be given its broadest interpretation within the terms of the following claims.

We claim:
1. An alternating current induction motor including a wound stator and a rotor therein, said stator being wound with adjacent groups of coils distributed about the stator in chorded relation and adapted to be connected together for polyphase operation of the motor, two of said groups of coils being connected together to provide a main, both starting and running, winding for single phase operation of the motor; and a third group of coils adjacent said first two groups of coils and also distributed about the stator in chorded relation, said third group of coils being displaced substantially 90 degrees from said first two groups of coils and having an accessible tapped point intermediate its ends.

2. An alternating current induction motor including a wound stator and a rotor therein, said stator being wound with adjacent groups of coils distributed about the stator in chorded relation and adapted to be connected together for polyphase operation of the motor; means connecting two adjacent groups of coils together to provide a main winding for single phase operation of the motor; means connecting a starting capacitor in parallel with one of said two groups of coils; switching means for disconnecting said starting capacitor; and means responsive to the counter E.M.F. across at least a portion of another of said groups of coils for operating said switching means.

3. An alternating current induction motor comprising: a wound stator and a rotor therein, said stator being wound with three groups of coils distributed about the stator in chorded relation; means connecting two adjacent groups of coils in series to provide a main winding; means connecting one end of the third group of coils to the connection between said first two groups of coils; means connecting a starting capacitor in parallel with one of said two groups of coils; means connecting said main winding across a single-phase supply; switching means for disconnecting said starting capacitor; means responsive to the counter E.M.F. across said third group of coils for operating said switching means; and a running capacitor connected in series with said third group of coils and to the same line of the single-phase supply to which the starting capacitor is connected.

4. An alternating current induction motor comprising: a wound stator and a rotor therein, said stator being wound with three groups of coils distributed about the stator in chorded relation; means connecting two adjacent groups of coils in series to provide a main winding; means connecting one end of the third group of coils to the connection between said first two groups of coils; means connecting a starting capacitor in parallel with one of said two groups of coils; means connecting said main winding across a single-phase supply; switching means for disconnecting said starting capacitor; means responsive to the counter E.M.F. across said third group of coils for operating said switching means; a running capacitor connected in series with said third group of coils and to the same line of the single-phase supply to which the starting capacitor is connected; and means for connecting the capacitors to the other line of said single-phase supply to reverse the direction of rotation of the rotor.

5. An alternating current induction motor adapted for either single phase or polyphase operation comprising: a wound stator and a rotor therein, said stator being wound with adjacent groups of coils distributed about the stator in chorded relation, said groups of coils being connected together to provide a distributed main, both starting and running, winding for single phase operation of the motor, said groups of coils being substantially equal; a starting capacitor; means for connecting said starting capacitor in parallel relation with one of said groups of coils to effect an out-of-phase relationship to the currents through said groups of coils to supply a starting torque to the rotor; means for disconnecting said starting capacitor as the rotor comes up to speed; and means for optionally connecting said starting capacitor across either of said groups of coils to control the direction of rotation of the rotor.

6. An alternating current induction motor adapted for either single phase or polyphase operation comprising: a wound stator and a rotor therein, the winding of said stator being distributed in three groups of coils wound in chorded relation about said stator; means connecting two adjacent groups of coils together; means energizing said two adjacent groups of coils from a single phase source; a starting capacitor; means connecting said starting capacitor in shunt relation across one only of said two adjacent groups of coils to effect an out-of-phase relationship in the currents through said two adjacent groups of coils to supply a starting torque whereby said two adjacent groups of coils serve as both starting and running windings for the motor on single phase operation; and means responsive for disconnecting said starting capacitor when the motor reaches a predetermined speed.

7. An alternating current induction motor adapted for either a single phase or polyphase operation comprising: a wound stator and a rotor therein, the winding of said stator being distributed in three groups of coils wound in chorded relation about said stator; means connecting two adjacent groups of coils together; means energizing said two adjacent groups of coils from a single phase source; a starting capacitor; means connecting said starting capacitor in shunt relation across one of said groups of coils to effect an out-of-phase relationship in the currents through said groups of coils to supply a starting torque whereby said two groups of coils serve as both starting and running windings for the motor on single phase operation; means connecting a running capacitor in series with the third group of coils to augment the starting and running torque of the motor; and means connecting said third group of coils to one line of said single phase source and first two groups of coils through said running capacitor, the main winding provided by the connected two adjacent groups of coils and the auxiliary winding provided by the third group of coils being displaced 90 degrees in the operation of the motor.

8. An alternating current induction motor adapted for either a single phase or polyphase operation comprising: a wound stator and a rotor therein, the winding of said stator being distributed in three groups of coils wound in chorded relation about said stator; means connecting two adjacent groups of coils together; means energizing said two adjacent groups of coils from a single phase source; a starting capacitor; means connecting said starting capacitor in shunt relation across one of said groups of coils to effect an out-of-phase relationship in the currents through said groups of coils to supply a starting torque whereby said two groups of coils serve as both starting and running windings for the motor on single phase operation; a running capacitor; means connecting said third group of coils to one line of said single phase source and to the point of connection between said first two groups of coils through said running capacitor to augment the starting and running torque of the motor, the main winding provided by the connected two adjacent groups of coils and the auxiliary winding provided by the third group of coils being displaced 90 degrees in the operation of the motor; and means for reversing one of said first two groups of coils and energizing said three groups of coils from a three phase power source to operate the motor as a conventional three phase motor.

9. An alternating current induction motor adapted for either a single phase or polyphase operation comprising: a wound stator and a rotor therein, the winding of said stator being distributed in groups of coils wound in chorded relation about said stator; means connecting two adjacent groups of coils together to form a main winding; means energizing said main winding from a single phase source; and means connecting a starting capacitor in shunt relation across one of said two groups of coils to effect an out-of-phase relationship in the currents through said groups of coils to supply a starting torque whereby said two groups of coils serve as both starting and running windings for the motor on single phase operation, at least said two groups of coils having a current-carrying capacity substantially double that required for normal polyphase operation at rated horsepower so as to secure single phase operation at the same horsepower as when operated polyphase at rated horsepower.

10. An alternating current induction motor adapted for either a single phase or polyphase operation comprising: a wound stator and a rotor therein, the winding of said stator being distributed in three groups of coils wound in chorded relation about said stator; means connecting two adjacent groups of coils together to form a main winding; means energizing said two adjacent groups of coils from a single phase source; a starting capacitor; means connecting said starting capacitor in shunt relation across one of said two groups of coils to effect an out-of-phase relationship in the currents through said groups of coils to supply a starting torque whereby said two groups of coils serve as both starting and running windings for the motor on single phase operation; a running capacitor; and means connecting the third group of coils to one line of said single phase source and to the point of connection between said first two groups of coils through said running capacitor, the wire of said coils having a current carrying capacity substantially double that required for three phase operation at rated capacity whereby said motor may be operated on single phase at the rated three phase horsepower.

11. An alternating current induction motor adapted for either a single phase or polyphase operation comprising: a wound stator and a rotor therein, the winding of said stator being distributed in three groups of coils wound in chorded relation about said stator; means connecting two adjacent groups of coils together to form a main winding; means energizing said two adjacent groups of coils from a single phase source; a starting capacitor; means connecting said starting capacitor in shunt relation across one of said groups of coils to effect an out-of-phase relationship in the currents through said groups of coils to supply a starting torque whereby said two groups of coils serve as both starting and running windings for the motor on single phase operation; a running capacitor; and means connecting the third group of coils to one line of said single phase source and to the point of connection between said first two groups of coils through said running capacitor, the wire of said coils having a current carrying capacity substantially double that required for three phase operation at rated capacity whereby said motor may be operated on single phase at the rated polyphase horsepower, and said winding and the magnetic circuit of the motor providing relative saturation of the stator on both single phase and polyphase operation.

12. An alternating current induction motor adapted for either single phase or polyphase operation comprising: a wound stator and a rotor therein, the winding of said stator being distributed in three groups of coils wound in chorded relation about said stator; means connecting two adjacent groups of coils together; means energizing said two adjacent groups of coils from a single phase source; a starting capacitor; means connecting said starting capacitor in shunt relation across one only of said two adjacent groups of coils to effect an out-of-phase relationship in the currents through said two adjacent groups of coils to supply a starting torque whereby said two adjacent groups of coils serve as both starting and running windings for the motor on single phase operation; a running capacitor; and means connecting said running capacitor in series with the third group of coils and the combined running capacitor and third group in parallel with the starting capacitor.

13. An alternating current induction motor adapted for either single phase or poly-phase operation comprising: a wound stator and a rotor therein, the winding of said stator being distributed in three groups of coils wound in chorded relation about said stator; means connecting two adjacent groups of coils together; means energizing said two adjacent groups of coils from a single phase source; a starting capacitor; means connecting said starting capacitor in shunt relation across one only of said two adjacent groups of coils to effect an out-of-phase relationship in the currents through said two adjacent groups of coils to supply a starting torque whereby said two adjacent groups of coils serve as both starting and running windings for the motor on single phase operation; a running capacitor; means connecting said running capacitor in series with the third group of coils and the combined running capacitor and third group in parallel with the starting capacitor; and means for disconnecting said starting capacitor when said motor reaches a predetermined speed.

References Cited by the Examiner

UNITED STATES PATENTS

| | | | |
|---|---|---|---|
| 1,050,444 | 1/13 | Fynn | 318—220 |
| 1,315,965 | 9/19 | Jennings | 318—221 |
| 1,707,423 | 4/29 | Bailey | 318—221 |
| 1,928,108 | 9/33 | Marvel | 318—221 |
| 2,606,311 | 8/52 | Burion | 318—220 |

FOREIGN PATENTS 230,786  5/44  Switzerland.

JOHN F. COUCH, *Primary Examiner.*